Dec. 1, 1970   KEIJI KOGAKI   3,543,610
HYDRAULIC CONTROL SYSTEM IN AN AUTOMATIC TRANSMISSION
Filed April 4, 1969   4 Sheets-Sheet 1

INVENTOR
Keiji Kogaki

BY George B. Oujevolk

ATTORNEY

United States Patent Office 3,543,610
Patented Dec. 1, 1970

3,543,610
HYDRAULIC CONTROL SYSTEM IN AN
AUTOMATIC TRANSMISSION
Keiji Kogaki, Toyota-shi, Japan, assignor to Toyota
Jidosha Kogyo Kabushiki Kaisha, Toyota-cho, Toyota-shi, Aichi-ken, Japan, a corporation of Japan
Filed Apr. 4, 1969, Ser. No. 813,410
Claims priority, application Japan, May 15, 1968,
43/32,735
Int. Cl. B60k
U.S. Cl. 74—867                                         3 Claims

ABSTRACT OF THE DISCLOSURE

A fluid pressure control system controlling the fluid pressure supplied to fluid lines acting on the automobile drive means including clutches and gearing. The required pressure is selectively supplied by the combination of a throttle relay valve and a pressure regulator valve which receive the fluid pressure line, vacuum throttle pressure line, pressure governor line and a two position check valve connected to the throttle relay valve. These valves have respectively a valve piece and a valve spool as well as a free slide valve next to the valve spool. The position of these components within the respective valves as well as the position of the check valve determines the interconnection between the various lines supplying fluid pressure to the fluid lines acting on the drive means.

BACKGROUND OF THE INVENTION

The present invention relates to an automobile transmission, and more particularly to a hydraulic control system of an automatic transmission for automobiles.

The output shaft of an automobile drive system is driven by an arrangement of sun gears and planetary gears, having accompanying idlers and pinions. These gears, are in turn actuated by clutches to assume various roles in gear trains depending on the drive conditions. The particular engagement of clutches and gears to form particular gear trains corresponding to these driving conditions as well as the response of the engine in these conditions is controlled by the manual valve position and by a servo oil system and, the present relates to the hydraulic control system for this servo oil pressure, and particularly to the fluid pressure supplied in the servo system for different speed shift positions of drive range (D), second range (2) and low range (L) which appear next to the shift stick of an automobile.

At the outset a distinction must be made between range and speed.

On the manual valve are the letters "L," "2" and "D" which correspond to the low, second and drive position of the manual valve. When the driver enters the automobile he places his valve in the drive range position (D) and starts off. At first he travels slowly at slow speed. Then, the transmission will automatically shift to second and finally to third speed. Thus low speed and low range (L) do not have the same meaning since low speed also exists in the drive range.

Briefly stated therefore, the present invention relates to an automotive fluid transmission system wherein fluid pressure is applied to various clutches and gears to form gear trains. Generally speaking, this fluid pressure is controlled by a fluid pressure circuit which includes a fluid pressure line (commonly identified as the $P_L$ line), a vacuum throttle pressure line (commonly identified as the $P_v$th line), a pressure governor line (commonly identified as the $Pgo$ line), and, the quantity of pressure and the respective lines selectively supplying the pressure is controlled by a throttle relay valve having a longitudinal chamber occupied partly by a spring biased valve piece disposed to move within the chamber. The throttle relay valve is in turn connected to a pressure regulator valve, also having an elongated chamber with a spring biased valve spool therein and a free riding slide valve next to the valve spool. The aforementioned fluid pressure line, vacuum throttle pressure line and pressure governor lines, together with other lines controlled by various driving conditions, are connected to said throttle relay valve and said pressure regulator valve, as well as to a two position check valve which selectively feeds said throttle relay valve. The spring tension of the bias springs as well as the check valve are so adjusted as to selectively connect the proper line into said valve combination and properly position the respective valve piece, valve spool and slide valve so as to supply the desired pressure.

The invention as well as the objects and advantages thereof will become more apparent from the following detailed description when taken in conjunction with the accompanying drawing, in which:

Figure 1:
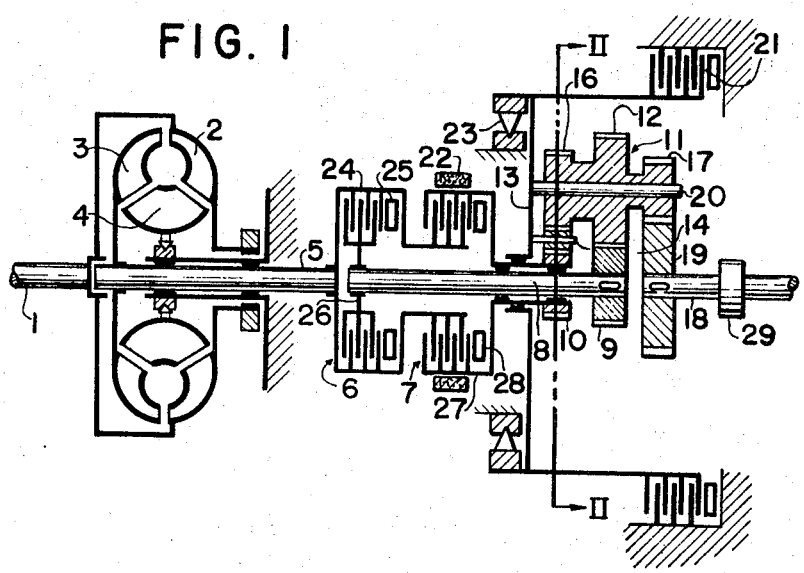
FIG. 1 is a schematic representation of an automatic transmission to which a hydraulic control system of the present invention is applicable.
Figure 2:
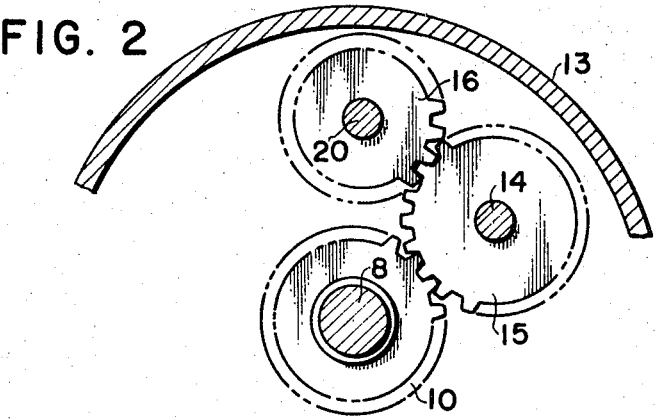
FIG. 2 is a sectional view of one part of section A—A of FIG. 1, illustrating the details relating to the gearing used in connection with the present invention.

To understand the hydraulic control system of the present invention, it is first necessary to understand the clutch and gearing arrangement which the system of the present invention is to control. This clutch and gearing arrangement is shown in FIG. 1, where a pump impeller 2 is directly coupled to an engine crank shaft 1. Engine power is transmitted to a turbine runner 3 by this pump impeller 2 through oil. Thus the oil is guided by a line to enter again into the pump impeller 2. By repeating the above oil-flow operation, a torque is continuously provided to the turbine shaft 5. The turbine torque thus provided is transmitted to speed change gearing behind the torque converter from the turbine shaft 5. There, the automatic transmission of 3 speed-forward and one speed-reverse by means of planetary gearing is accomplished by the automatic control of multiple disc clutches 6, 7, brake band 22, and low and reverse brake 21 with the requisite servo oil pressure.

Regarding the construction of the speed change gearing behind the torque converter, the turbine shaft 5 coupled to the turbine runner 3 acts as an input shaft to the planetary gear unit. This turbine shaft 5 has a drum 24 with splines.

In the drum 24 there is provided a multiple disc front clutch 6 which is turned "ON" (applied) or "OFF" (released) by a piston 25 operated by oil pressure through a back spring. The drive plates of this front clutch are assembled with drum 24 by splines on the outer periphery and the clutch discs are prevented from rotation by splines and a hub 26 on the inner periphery.

Hub 26 is affixed to an intermediate shaft 8 by the splines. The front clutch drum 24, prevents the rotation of the clutch discs of a multiple disc rear clutch 7 and is connected to said clutch discs for the rotation by splines.

The driven plates of rear clutch 7 are connected to a clutch drum 27 on the outer periphery by the splines and turned "ON" (applied) or "OFF" (released) by a piston 28. The intermediate shaft 8 connected with the hub 26 of front clutch 6 has an input sun gear 9 towards its rear end. The rear brake drum 27 is connected to a reverse sun gear 10 by a suitable rotation stopper. The input sun gear 9 engages a gear 12 and a suitable number of pinions 11 of plentary gears (for instance 2 or 3 sets) arranged on the periphery. The reverse sun gear 10 engages with an idler gear 15 which is slidably fitted on a pin 14 mounted on a carrier 13 and said idler gear 15 engages with a gear 16 of the above pinions 11.

A gear 17 situated at the rear end of the pinions 11 engages with a gear 19 of the output shaft 18 of the transmission. The pinions 11 provided with gears 16, 12, 17 are held by a pinion pin 20 and also the pinion (idler gear) 15 as explained above are held by the pinion pin 14 upon carrier 13. The carrier 13 contacts a low-and-reverse brake 21 for braking and is stopped or is made free by operating this brake 21. Similarly, band 22, on the outer periphery of the rear clutch drum, drum 27 and sun gear 10 are engaged or are made free by operation of the band 22. A one-way brake 23 contained in the carrier 13 performs the same function as the low-and-reverse brake 21 at the low gear position as will be apparent.

For a better understanding of the invention, the operating condition for 3 speed-forward and one speed-reverse obtainable with the foregoing system will be described:

THE FIRST SPEED

The front clutch 6 and the low-and-reverse brake 21 and one-way brake 23 are operated. However, since when driving the engine, even if the low-and-reverse brake 21 does not work, the one-way brake 23 works, the same result takes place, therefore in practice, the one-way brake, operation of the low-and-reverse brake 21 is not necessary so that normally no power is to be transmitted from the output shaft from brake 21.

The rotation of turbine shaft 5 is transmitted to the input sun gear 9 through the front clutch 6. Since the carrier 15 is held by the low-and-reverse brake 21, the pinion 20 is also fixed and the input rotation is transmitted from the gear 9 through the gear 12 and gear 17 to the gear 19 of output shaft and reduced according to the necessary relationship as in the case of usual gears.

THE SECOND SPEED

The front clutch 6 remains in the applied condition, now the low-and-reverse brake 21 is released and the band 22 is operated to work.

Thus, the turbine shaft 5 and the input sun gear 9 are engaged and, rotate as one body, however, the clutch drum 27 and also the reverse sun gear 10 are fixed by the band 22 so as to come to a stand-still. In this condition, the rotation of turbine shaft 5 is transmitted to the input sun gear 9, thus the pinions 11 are going to rotate in the opposite direction (counter-clockwise direction) to the rotating direction of the turbine shaft 5 (clockwise direction). This motion acts on the gear 15 to rotate in the clockwise direction through gear 16, while the gear 10 engaged with the gear 15 is fixed, so that the pinion pin 14 rotates in the clockwise direction. This rotary motion is additionally applied to the input sun gear 9 and the output shaft gear 19 which are same as the turbine shaft 5. Because the number of teeth of gear 12 is greater than of gear 17, the rotation of shaft 8 on the input side is higher than that of output shaft 18. That is, a speed reduction is accomplished.

THE THIRD SPEED

Both the front and the rear clutch are operated. Because the input sun gear 9 and the reverse sun gear 10 are connected in a body to rotate, the entire planetary gear unit is connected for rotation. Accordingly, the output shaft 18 also rotates with the same speed as the turbine shaft 5.

REVERSE

The rear clutch 7 and the low and reverse brake 21 are to be operated. Thus, the pinion-pins 14 and 20 are fixed and the rotation from the turbine shaft 5 is transmitted to the reverse sun gear 10 through the rear clutch 7 and then transmitted to the output shaft gear 19 through the pinions 15 and 17, so that the output shaft 18 is made to rotate in reverse.

To summarize the foregoing explanation, reference is made to the following table:

TABLE I

| Speed | Clutch means used | Gearing used | Gearing type |
|---|---|---|---|
| First | 6, brake 21, one-way brake 23. | 9, 12, 17, 19 | Reduction. |
| Second | 6, 22 | 9, 12, 15, 16, 17, 19 | Do. |
| Third | 6, 7 | (¹) | Equal. |
| Reverse | 7, brake 21 | 10, 15, 17, 19 | Reduction. |

¹ All gears.

Figure 3:
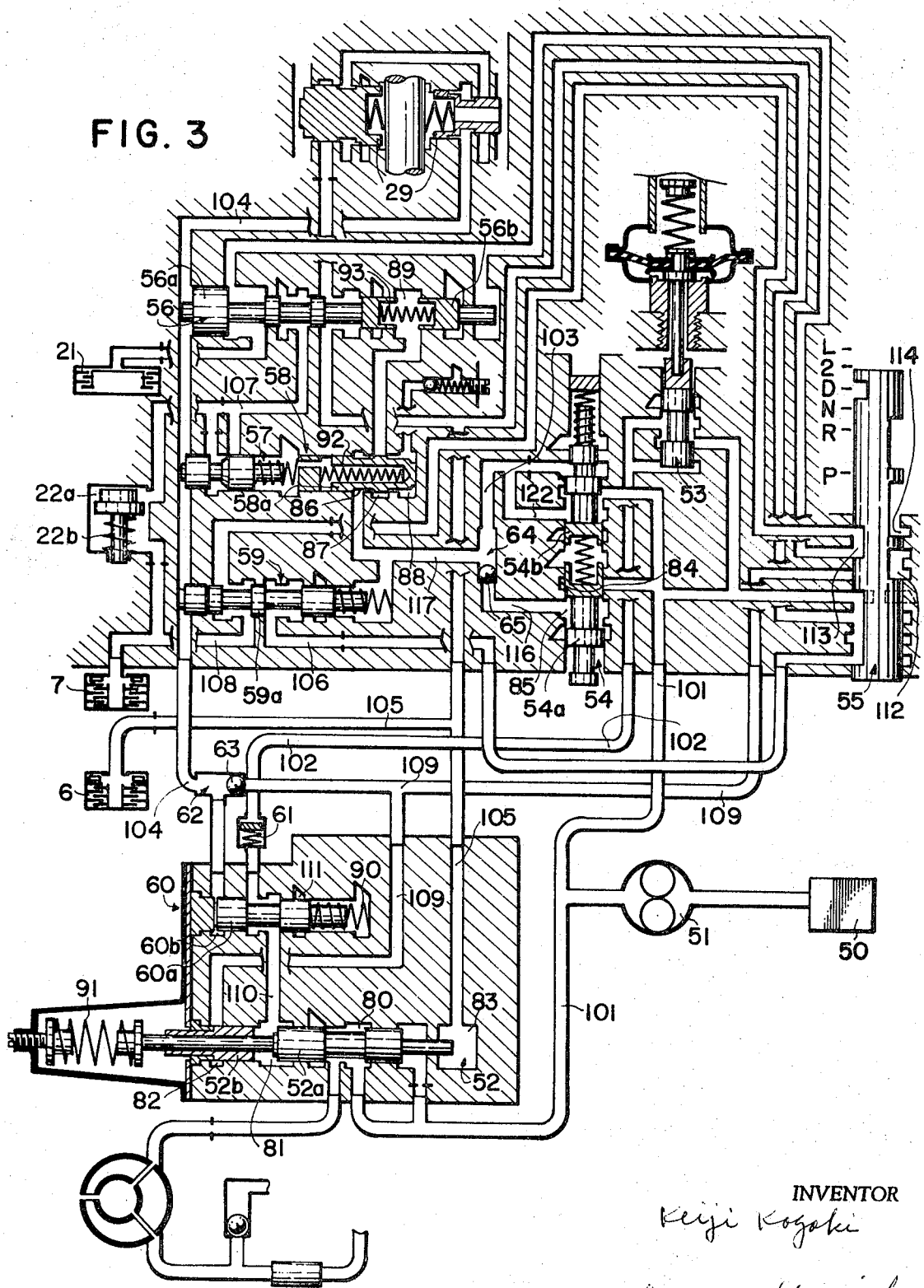
FIG. 3 is a hydraulic diagram of the control system of the present invention showing the entire system and illustrating the operation of the drive range.

According to the present invention there is provided a hydraulic control system for the servo oil pressure used to actuate the above clutches 6, 7, brake 21 and the brake band 22. In FIG. 3 the oil is pumped up from an oil sump 50 by an oil pump 51 directly driven by the engine through pump impeller 2 and is supplied to the pressure line passage 101. The oil pressure of this line 101 is regulated by the pressure regulator valve 52 to be transmitted to a vacuum throttle valve 53 and a throttle valve 54. A negative pressure of the suction pipe is perceived as a valve displacement by the vacuum throttle valve 53 and an oil pressure proportional to this displacement is produced in line 102. Also the opening of engine throttle valve is perceived by the throttle valve 54 as a plug displacement, and oil pressure proportional to this displacement is produced in pressure line 103. Meanwhile, the car speed is detected by a governor 29 driven by the output shaft 18 and supplied to line 104 as a governor pressure. Change-over of the reduction ratio of the planetary gear is carried out by shift valves (speed change valves) 56, 59 which are operated by the above throttle pressure and governor pressure. That is, the line pressure is supplied to the oil pressure lines 105, 106 which connects a manual valve 55 to the front clutch 6 and the rear clutch 7 at the drive position D position of manual valve 55 (drive range) and it is supplied to the oil pressure line 105 which connects manual valve 55 to the front clutch 6 at the second position (second range), and in case the governor pressure is low, the oil path to the rear clutch 7 and the band 22 is opened thus the first speed condition is established by the front clutch 6 and the one-way brake 23. When the car speed has attained nearly a speed equivalent to the opening of the throttle valve, one-two shift valve 56 is actuated by the governor pressure to move so as to make pressure line 105 connect to pressure line 107. Then, the line pressure works on both the band 22 and the front clutch 6, thus the second speed condition is established. When the car speed has attained a speed equivalent to the opening of the throttle valve, two-three shift valve 59 is actuated by the governor pressure to move so as to make oil pressure line 106 connect to oil pressure line 108, thus the line pressure works on both the front clutch 6 and the rear clutch 7 and at the same time works on the release side 22b of band 22, therefore the band 22 is released, the planetary gears all rotate, the output shaft is directly coupled with and driven by the turbine shaft 5, and the third speed condition is established (this is only at the drive, D position). Speed-change from the direct-couple drive to the reduction drive can be carried out by relieving pressure of lines 106, 107 by means of one-two shift valve 56 and two-three shift valve 59.

Figure 4:
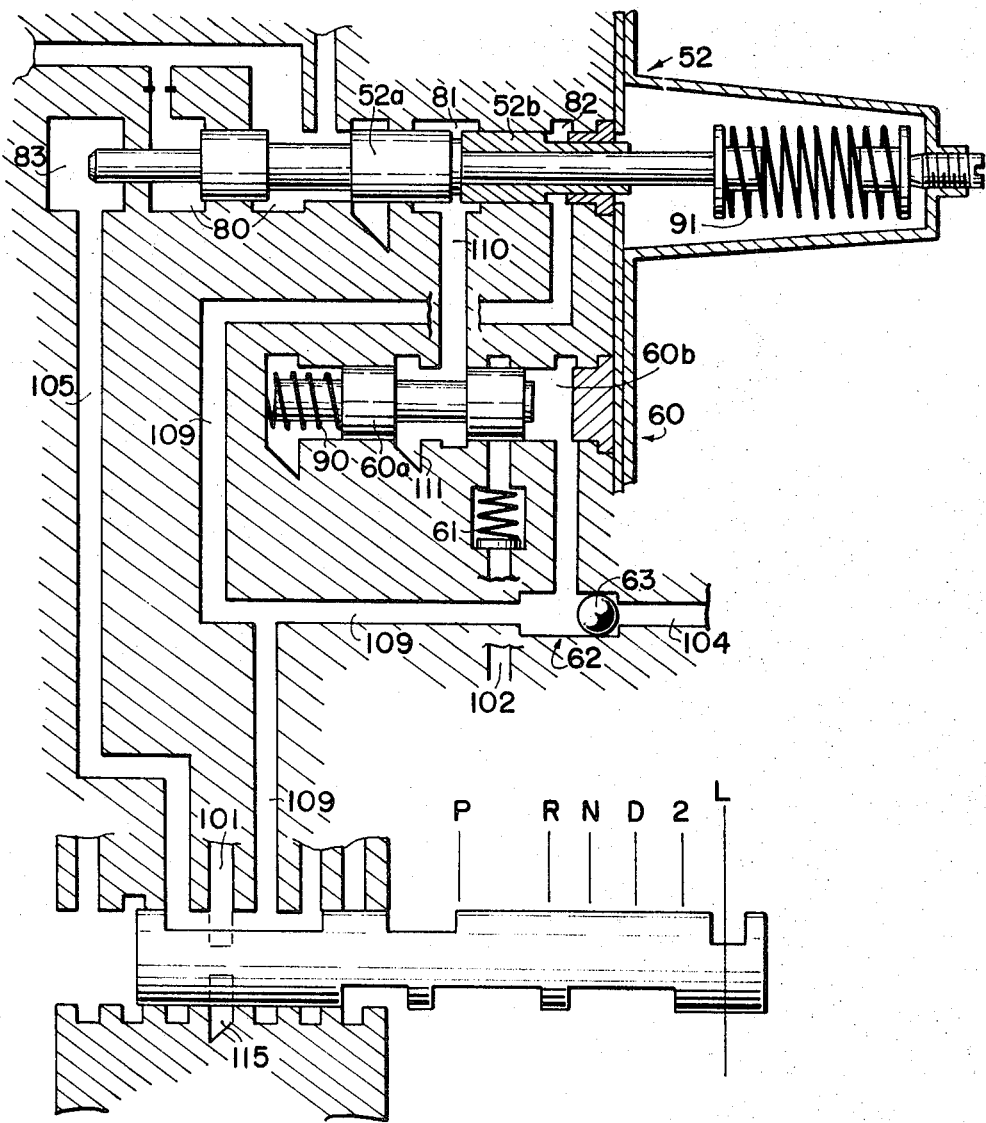
FIG. 4 is a hydraulic diagram of a portion of the system shown in FIG. 3, greatly enlarged, for the purpose of highlighting the present inventive concept.
Figure 5:
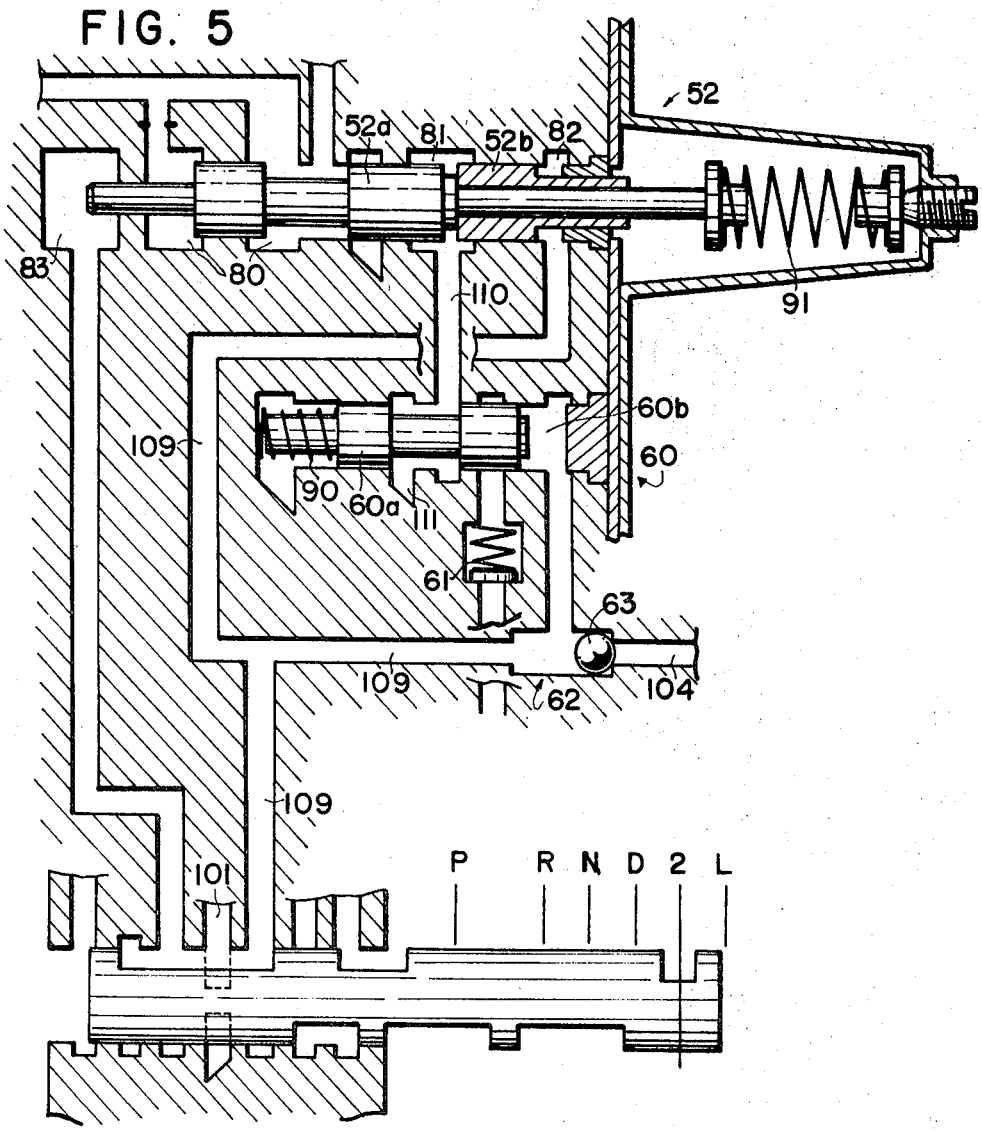
FIG. 5 is a hydraulic diagram similar to FIG. 4 of a portion of the system shown in FIG. 3, also greatly enlarged, for the purpose of highlighting the present inventive concept; and, FIG. 6 is a graphic illustration of the control oil pressure obtainable in the hydraulic control system of the present invention.

These pressures are controlled by the relay valve 60 and the pressure regulator valve 52. An important feature of the present invention relates to the pressure control lines when the manual valve 55 is at the L position (low range) and at the 2 position (second range), as shown in FIG. 4 and FIG. 5 in which the main features are taken from the hydraulic diagram of FIG. 3 but enlarged. The relay valve 60 is to be applied a pressure on the right end surface 60b of valve piece 60a from either the line 104, i.e., governor pressure or pressure of line 109. The pressure is selected by a check ball 62, and a coil spring 90 on the left end of valve piece 60a. The position of valve piece 60a is controlled by the governor pressure or the line pressure and the force of the coil spring 90 to move right or left. However the force of coil spring 90 is preset. Therefore, relay valve 60 operates according to the change of the governor pressure or the line pressure. When the governor pressure acts on the right end of chamber 60b by selection of the check ball 62, the valve piece 60a is moved rightwards by spring force of the coil spring 90. This is the case when the speed of output shaft 18 is low and the governor pressure is low. Thus the oil pressure line 110 is connected to the oil pressure line 102, the vacuum throttle pressure is made to act on the pressure regulator valve 52 through the line 102. If the speed of output shaft 18 becomes higher and the governor pressure increases, said governor pressure overcomes the force of coil spring 90 to move the valve piece 60a leftwards. Then, the connection between line 110 and the line 102 is interrupted. Line 110 is, on the contrary, connected to the pressure-relief line 111, and the pressure 110 is relieved through line 111. Next, when the line pressure works on the right end chamber 60b of relay valve 60 by the action of the check ball 63, because this line pressure is high pressure, it always overcomes the force of coil spring 90 to move the valve 60a leftwards, therefore as in the high speed condition when the governor pressure has worked, relay valve 60 connects line 110 to line 111. Again, the pressure of line 110 is relieved through line 111.

The pressure regulator valve 52 is to regulate the line pressure which is supplied to the clutches 6, 7, 21 and the brake 22. On the left side chamber 80 of the valve spool 52a there acts the oil pressure from oil pump 51. On the other hand, on the right end of valve spool 52a there is a coil spring 91 and valve chambers 81, 82 are provided. The pressure of line 110 is to be supplied to chamber 81 and the pressure of line 109 to chamber 82. Moreover, a slide valve 52b which is fitted in the valve spool 52a and free to slide is provided between the chamber 81 and the chamber 82, said slide valve 52b is controlled by the pressure acting on chambers 81 and 82 to move right or left and now if the line pressure works on the chamber 81, the valve 52b moves rightwards to close the chamber 82 to prevent oil leakage from the chamber 81 into the circuit 109. Next, when the vacuum throttle pressure works on the chamber 82 the valve 52b is moved leftwards until touching a stepped portion of valve spool 52a, thus the pressure acting on chamber 82 is made to act on the valve spool 52a.

The hydraulic control process for respective gear positions of the manual valve 55 in the pressure control lines of the relay valve 60 and the pressure regulator valve 52 which works as hereinbefore outlined will now be described.

The operating condition of the pressure line at D position of manual valve 55 (drive range) is shown in FIG. 3, the line pressure of line 109 is relieved through the lines 112, 113, and 114 at the manual valve, so that the pressure is not to work on said line 109 and the check ball 63 of check ball unit 62 is pushed to the lower position to shut off the line 109 and release the line 104 thus the governor pressure of line 104 is at work on the chamber 60b of relay valve 60. In this condition, now assuming the speed is low and the valve 60a of relay valve is upwards (shown in FIG. 3), the vacuum throttle pressure is supplied to the chamber 81 of pressure regulator valve 52 to move the valve spool 52a downwards in cooperation with the force of coil spring 91 so that the vacuum throttle pressure is supplied to the line 110, therefore the oil in the chamber 80 produces a pressure in response to the pressure of the right chamber 81 (this pressure is called the line pressure) thus it is to be supplied from the line 101 to the required clutches and brake bands. Further, the line pressure in this case is low when the vacuum throttle pressure is low, while it becomes high when said vacuum throttle pressure is high. This condition is illustrated in the low speed portion of D line in the characteristic diagram of FIG. 6. When the valve piece 60a of relay valve 60 is moved downwards by speed-up of the car, line 110 and line 111 are connected to relieve the pressure in chamber 81 of pressure regulator valve 52 so that the valve spool 52a is moved upwards by the pressure of chamber 80 overcoming the force of coil spring 91. Then, the oil in chamber 81 is drained off, therefore the oil in chamber 80 always keeps a low and constant pressure irrespective of the throttle pressure, which is supplied through the circuit 101 as a line pressure. This condition is illustrated in the high speed portion of D line in the characteristic diagram of FIG. 6.

Next, FIG. 4 illustrates the operating condition for the pressure lines at the L position (low range) of the manual valve and FIG. 5 illustrates the operating condition for the pressure lines at the 2 position (second range) of the manual valve. Since both control methods in the low range and the second range are identical, it is possible to explain the hydraulic control in the low range and the second range for both FIG. 4 and FIG. 5 together, under these range conditions. Line 101 and line 109 are connected by the manual valve 55 and the line pressure of line 101 is also supplied to line 109, so that the ball 63 of check ball unit 62 is always in position in the right direction by the line pressure overcoming the pressure of line 104 to shut off the line 104 to open the line 109. Thus the line pressure of said line 109 acts on the chamber 60b of relay valve 60. Moreover, since this line pressure is always higher than the governor pressure, the ball 63 of check ball unit 62 will always keep in the right directional position and also the valve piece 60a is always positioned in the left direction to make line 110 and the pressure relief line 111 communicate with each other to relieve the pressure of chamber 81 of pressure regulator valve 52. On the other hand, pressure line 109 is connected to chamber 82 of pressure regulator valve 52, the line pressure being supplied to the chamber 82 in this conditon of range. The line pressure acts on the slide valve 52b providing a left directional force in the chamber 82. The acting force of said slide valve 52b works on the valve piece 52b of pressure regulator valve 52 as a left directional force in cooperation with the coil spring 91 and the pressure of the left chamber 80 becoming a constant high pressure in response to said acting force, this high pressure oil is supplied from the line 101 as a line pressure to the brakes and to the clutches.

Figure 6:
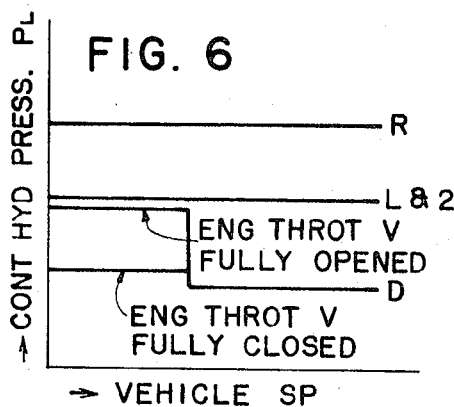

The L and 2 line in the characteristic diagram shown in FIG. 6 shows the control oil pressure obtained in the above control system. As understood from this diagram, the line pressure $P_L$ in the low range and the second range is obtainable as a constant oil pressure regardless of the car speed.

The operating condition of the pressure lines at the R position (reverse range) is not shown in the diagrams. However this condition is such that under the pressure condition of the low and the second range shown in FIG. 4 and FIG. 5 the oil pressure acting on the chamber 83 of pressure regulator valve 52, is relieved through the line 105 and the pressure relief line 115, is not to work on the chamber 83, therefore for the control oil pressure in said range a constant pressure higher than the pressure at the low and the second range can be obtainable. This is illustrated by R line in the characteristic diagram of FIG. 6.

As explained previously, in the drive range D there are preferable control pressures for ordinary drive condition: that is, the high control oil pressure is needed in case of low speed and the low control oil pressure is needed in case of high speed. Whereas in the low and the second range the constant high control oil pressure is produced irrespective of the speed. The reason why it is necessary to obtain such a constant high control oil pressure in the low and the second range is due to the fact that when requiring an engine brake during running with the drive range D of manual valve 55, with high speed, the engine brake is obtainable. If the manual valve 55 is in the second range, and also in a low range, L a larger engine brake is obtainable. However should the characteristic of oil pressure in the low (L) and the second range (2) be same as that in the drive range (D), because the engine throttle valve is usually fully closed in the engine brake condition, the brake band 22 being actuated, the line pressure PL would come down to a comparatively low value as shown in FIG. 6, which is not a sufficient oil pressure effectively to operate the engine brake. Hence, if a constant control oil pressure is obtainable irrespective of the car speed in the low range and the second range as intended by the present invention, this defect is removed, and the engine brake fulfills its function effectively.

Moreover, according to this invention, changeover from the line pressure to the vacuum throttle pressure or vice versa is possible by employment of slide valve 52b in the pressure regulator valve 52 and moreover when the line pressure is actuated in the chamber 82, any optional constant high pressure can be produced by changing a difference of area between the valve 52a and the slide valve 52b, thereby it is possible to assemble the pressure regulator valve 52 in a compact size.

To facilitate understanding of the foregoing explanation, the line connections for drive (D) and second (2) and low (L) range is given in Table 2.

TABLE 2

Drive (D)

Line 109 is shut by the ball
Line 104 (Pgo) acting on valve 60 (at low drive speeds)
Line 102 (Pvth) connected to chambers 80–81
Line 101 (P$_L$) connected to chambers 80–81

Low and second (L) and (2)

Line 101 (PL) connected to line 109
Line 104 (Pgo) shut by ball
Line 109 acts on valve 60
Lines 110 and 111 connected through valve 80
Line 109 connected to chamber 82

Note:
P$_L$—line pressure
Pgo—Pressure governor
Pvth—Vacuum throttle pressure

It is to be observed therefore that the present invention provides for a pressure control system for an automotive fluid transmission having low, second and drive range positions. These range positions respectively acting on fluid lines which in turn act on the automotive drive means including clutches and gearing to supply drive power corresponding to these range positions. These fluid lines are controlled by a fluid pressure circuit supplying the necessary control pressure. This pressure circuit includes a fluid pressure line 101 (called a P$_L$ line), a vacuum throttle pressure line 102 (called a Pvth line), a pressure governor line 104 (called the Pgo line). These lines are selectively interconnected or so connected to the fluid lines acting on the drive means by a throttle relay valve 60 coupled to a pressure regulator valve. The throttle relay valve 60 has a longitudinal chamber partially occupied by a spring biased piece valve 60a which can move within said chamber. The throttle pressure line 102, a pressure connecting line 110, a pressure relief line 111 and a check valve line lead into said valve chamber, the position of the valve piece 60a defining the interconnection of these lines. The pressure regulator valve is disposed for operative connection to the relay valve and also has an elongated chamber with a valve spring (91) at one end with a rod extending therefrom, a valve spool 52a mounted thereon and a free riding slide valve 52b interposed between the valve spool and spring. The pressure connecting line 110 interconnects the pressure regulator valve with the relay valve 60. Also, a low drive pressure line 109 and fluid pressure line 101 are connected to said pressure regulator valve. The position of the valve spool 52a and the slide valve 52b determine the interconnection of these lines. The check valve line leading to the throttle relay valve 60 is connected to a two position check valve 62 which receives as input, either the pressure governor line 104 or the low speed drive line 109 depending on the one or the other position of the check valve so that the relay valve spring 90 and the check valve determines the input to said throttle relay valve.

I claim:

1. A fluid pressure control system controlling the fluid pressure supplied to fluid lines acting on an automobile drive means having clutches and gearing, to selectively supply the pressure required for various drive range positions comprising in combination a throttle relay valve and a pressure regulator valve disposed for interconnection, said valves having spring-biased spool means therein and said pressure regulator valve additionally having a free slide valve therein between the spool means and the spring bias; a plurality of lines leading into said throttle relay valve chamber including a throttle pressure line (102) supplying pressure engagement corresponding to the throttle position, an oil pressure connecting line (110) connecting said pressure regulator valve to said throttle relay valve, a pressure relief line (111) and a check valve line, said spool means of the throttle relay valve defining the interconnections between said lines; a plurality of lines leading into said pressure regulator valve including said oil pressure connecting line (110) a low drive pressure line (109) and a fluid pressure line (101), the position of said valve spool means and said free slide valve in said pressure regulator valve defining the interconnections between said lines; and, a two position check valve (62) whose outlet is to said check valve line, receiving as an input either said low speed drive line (109), or at the output of a pressure governor line which is responsive to a speed sensing governor, depending on the one or the other of said two valve positions.

2. A system as claimed in claim 1 said two position check valve having an elongated hollow body with first and second inlets at opposed longitudinal ends thereof connected to said pressure governor line (104) and said low speed drive valve (109), an outlet to said check valve line therebetween and a check ball (63) disposed to take position at the one or the other side of said hollow body depending on the pressure provided to block the first or the second of said inlets.

3. In an automotive fluid transmission system having low, second and drive range positions, said range positions acting on fluid lines which lines in turn act on the automotive drive means including clutches and gearing to supply drive power of a nature corresponding to said respective ranges, said fluid lines being controlled by a fluid pressure circuit supplying the necessary control pressure including a fluid pressure line (101), a throttle pressure line (102) supplying pressure engagement corresponding to the throttle position, and a pressure governor line (104) controlling said drive means pressure in response to the input from a governor, the improvement therein to control said supplied fluid pressure comprising in combination:

(a) a throttle relay valve (60) having a longitudinal chamber occupied partially by a valve piece (60a) which can move within said chamber, with a spring (90) at one end of said chamber, normally biasing said valve piece (60a) to one side of the chamber;

(b) a plurality of lines leading into said relay valve chamber including said throttle pressure line (102), an oil pressure connecting line (110), a pressure relief line (111) and a check valve line, said biased valve piece (60a) defining the interconnections between said lines by its position;

(c) a pressure regulator valve disposed for operative connection to said relay valve having an elongated chamber with a valve spring (91) at one end, a rod extending from said valve spring, and at least one valve spool (52a) mounted thereon with a free riding slide valve (52b) interposed between said valve spool and said spring;

(d) a plurality of lines leading into said pressure regulator valve including said oil pressure connecting line (110) which interconnects the pressure regulator valve with said relay valve (60), a low drive pressure line (109), and said fluid pressure line (101), the position of said valve spool (52a) and slide valve (52b) determining the interconnection of said lines; and, (e) a two position check valve (62) whose outlet is said check valve line which receives as input either said pressure governor line (104) or said low speed drive line (109) depending on the one or the other of said two valve positions, said relay valve spring (90) and said check valve determining the input to said relay valve as being either low speed drive line (109) or pressure governor line (104).

References Cited

UNITED STATES PATENTS

| | | | |
|---|---|---|---|
| 2,528,584 | 11/1950 | Farkas | 74—763 X |
| 2,566,518 | 9/1951 | Farkas | 74—763 X |
| 2,788,678 | 4/1957 | Sheppard | 74—869 X |
| 3,118,320 | 1/1964 | Ivey | 74—869 |
| 3,272,029 | 9/1966 | Duffy | 74—869 |
| 3,425,300 | 2/1969 | Ohya et al. | 74—763 |

ARTHUR T. McKEON, Primary Examiner

U.S. Cl. X.R.

74—763